(12) United States Patent
Azdasht

(10) Patent No.: US 11,224,928 B2
(45) Date of Patent: Jan. 18, 2022

(54) DEVICE FOR THE SEPARATE APPLICATION OF SOLDER MATERIAL DEPOSITS

(71) Applicant: PAC TECH—PACKAGING TECHNOLOGIES GMBH, Nauen (DE)

(72) Inventor: Ghassem Azdasht, Berlin (DE)

(73) Assignee: PAC TECH—PACKAGING TECHNOLOGIES GMBH, Nauen (DE)

( * ) Notice: Subject to any disclaimer, the term of this patent is extended or adjusted under 35 U.S.C. 154(b) by 556 days.

(21) Appl. No.: 15/102,357

(22) PCT Filed: Oct. 23, 2014

(86) PCT No.: PCT/EP2014/072732
§ 371 (c)(1),
(2) Date: Jun. 7, 2016

(87) PCT Pub. No.: WO2015/090686
PCT Pub. Date: Jun. 25, 2015

(65) Prior Publication Data
US 2016/0354853 A1 Dec. 8, 2016

(30) Foreign Application Priority Data
Dec. 19, 2013 (DE) .................. 10 2013 114 453.5

(51) Int. Cl.
*B23K 1/005* (2006.01)
*B23K 3/06* (2006.01)
*B23K 26/03* (2006.01)

(52) U.S. Cl.
CPC .......... *B23K 1/0056* (2013.01); *B23K 3/0623* (2013.01); *B23K 26/034* (2013.01)

(58) Field of Classification Search
CPC ... B23K 1/0056; B23K 3/0623; B23K 26/034
(Continued)

(56) References Cited

U.S. PATENT DOCUMENTS 5,977,512 A * 11/1999 Azdasht ............... B23K 1/0056
219/121.63
6,119,919 A * 9/2000 Kasulke ................. B23K 1/018
228/119

(Continued)

FOREIGN PATENT DOCUMENTS

| CN | 101038986 A | 9/2007 |
| CN | 101246008 A | 8/2008 |

(Continued)

OTHER PUBLICATIONS

Machine Translation of DE19838532; Aug. 2018.*
(Continued)

*Primary Examiner* — Tu B Hoang
*Assistant Examiner* — Thomas J Ward
(74) *Attorney, Agent, or Firm* — Quarles & Brady LLP

(57) ABSTRACT

The invention relates to a device (10) for the separate application of solder material deposits (11), in particular solder balls, comprising a conveying device (19) for separately conveying the solder material deposits from a solder material reservoir (12) toward an application device (33), the conveying device having transport holders that are formed as passage holes and that can each be moved from a receiving position, in which a solder material deposit is received from the solder material reservoir, into a transfer position P2, in which the solder material deposit is exposed to a pressure gas, and from which the solder material deposit is transferred to an application opening of an application nozzle (36) of the application device into an application position P3, wherein a detector device (69) is provided that (Continued)

serves to trigger a treatment of the solder material deposit arranged in the application position P3 with laser radiation emitted by a laser device, wherein the detector device has a reflection sensor (70) that detects reflection radiation (72) that is reflected by the solder material deposit arranged in the application position P3.

7 Claims, 4 Drawing Sheets

(58) Field of Classification Search
USPC .................. 228/33, 41, 51, 52; 219/616
See application file for complete search history.

(56) References Cited

U.S. PATENT DOCUMENTS

| | | | |
|---|---|---|---|
| 6,152,348 | A | 11/2000 | Finn et al. |
| 6,336,581 | B1 | 1/2002 | Tuchiya et al. |
| 7,121,449 | B2 * | 10/2006 | Zakel ............... B23K 3/0607 228/102 |
| 7,810,705 | B2 * | 10/2010 | Mizuno ............. B23K 3/0623 228/260 |
| 2005/0031776 | A1 | 2/2005 | Zakel et al. |
| 2007/0131661 | A1 | 6/2007 | Reiber |
| 2007/0228021 | A1 | 10/2007 | Wagou et al. |
| 2008/0179298 | A1 | 7/2008 | Nakayama et al. |
| 2010/0089981 | A1 | 4/2010 | Matsumoto et al. |
| 2013/0092666 | A1 | 4/2013 | Oh |
| 2013/0256277 | A1 | 10/2013 | Li et al. |
| 2016/0354853 | A1 | 12/2016 | Azdasht |

FOREIGN PATENT DOCUMENTS

| | | | |
|---|---|---|---|
| CN | 202114398 U | | 1/2012 |
| CN | 103042308 A | | 4/2013 |
| CN | 203062088 U | | 7/2013 |
| CN | 103358020 A | | 10/2013 |
| CN | 203973008 U | | 12/2014 |
| DE | 42 00 492 | | 4/1993 |
| DE | 195 41 996 | | 5/1997 |
| DE | 195 44 929 | | 6/1997 |
| DE | 198 38 532 | | 4/1999 |
| DE | 19838532 | * | 4/1999 |
| DE | 102 57 173 | | 6/2004 |
| JP | H11 114737 | | 4/1999 |
| JP | H11514933 A | | 12/1999 |
| JP | 2008207244 A | | 9/2008 |
| JP | 2011023609 A | | 2/2011 |
| KR | 1020010072700 A | | 7/2001 |

OTHER PUBLICATIONS

Japan Patent Office, Notice of Grounds of Rejection, Application No. 2016-537485, dated Mar. 6, 2018, 6 pages.
Korean Intellectual Property Office, Notice of Rejection, Application No. 10-2016-7014960, dated May 8, 2017.
International Search Report dated Apr. 2, 2015 for International Application No. PCT/EP2014/072732.
State Intellectual Property Office of People's Republic of China, First Office Action and Search Report, Application No. 201480067440.7, Jun. 14, 2018, 17 pages.
PCT English Language Translation of the International Preliminary Report on Patentability, PCT/EP2014/072732, dated Jun. 30, 2016.

* cited by examiner

DEVICE FOR THE SEPARATE APPLICATION OF SOLDER MATERIAL DEPOSITS

CROSS-REFERENCE TO RELATED APPLICATIONS

This application represents the national stage entry of PCT International Application No. PCT/EP2014/072732 filed Oct. 23.2014 and claims priority to German Patent Application. No. 10 2013 114 453.5 filed Dec. 19, 2013. The contents of this application are hereby incorporated by rerence as if set forth in their entirety herein.

The invention relates to a device for the separate application of solder material deposits, in particular solder balls, comprising a conveying device for separately conveying the solder material deposits from a solder material reservoir toward an application device, the conveying device having transport holders that are formed as passage holes and that can each be moved from a receiving position P1, in which a solder material deposit is received from the solder material reservoir, into a transfer position P2, in which the solder material deposit is exposed to a pressure gas and from which the solder material deposit is transferred to an application opening of an application nozzle of the application device into an application position P3, wherein a detector device is provided that serves to trigger a treatment of the solder material deposit arranged in the application position P3 with laser radiation emitted by a laser device.

A device of the kind mentioned in the introduction is known from DE 195 41 996 A1. As a detector device, said device has a pressure sensor that measures the gas pressure in the application device between the transport holder arranged in the transfer position P2 and an application opening in the application nozzle. For this purpose, the pressure sensor is arranged in the housing of the device and is connected to an application duct formed in the application device via a pressure bore formed in the housing and detects a positive pressure forming in the application duct, said positive pressure occurring when the application opening is closed by a solder material deposit arranged in the application position P3. Controlled by the pressure sensor, the laser treatment is triggered upon achieving a defined switching pressure when a solder material deposit is located in the application position P3 and blocks the application opening.

It becomes clear from these explanations that for the laser treatment to be triggered by a pressure sensor, a special constructional design of the housing of the device is required in such a manner that, on the one hand, the pressure sensor is connected to the application duct via a pressure bore and is integrated into the housing and that, on the other hand, the housing or the application device realized in the housing must be sufficiently sealed in order to allow a proper function of the pressure sensor, said function requiring, in case of the application opening being blocked by a solder material deposit, that a positive pressure is reached that is sufficient for the switching function of the pressure sensor, The use of a pressure sensor thus requires extensive constructional effort including a correspondingly complex design of the housing.

It is the object of the present invention to allow triggering of the treatment of the solder material deposit arranged in the application position with laser radiation independently of a pressure sensor.

To this end, the device according to the invention exhibits the features of claim 1.

According to the invention, the detector device has a reflection sensor that detects reflection radiation that is reflected by the solder material deposit arranged in the application position P3.

In contrast to the known device, in which a pressure sensor is used to trigger the laser treatment, the device according to the invention uses an optical sensor that detects the laser radiation reflected from the solder material deposit so that according to the invention the laser device, which is used anyway as an energy source for treating the solder material deposit with melting energy, simultaneously provides the medium, namely the laser radiation, so as to allow detection of the solder material with the aid of the optical sensor.

When the device according to the invention is in operation, a laser to device having at least two power settings is operated for this purpose, a so-called pilot beam of relatively low energy density being emitted on a first power setting, said pilot beam allowing reflection radiation to form upon hitting a solder material deposit arranged in the application opening, said reflection radiation being detected by the reflection sensor. If it is clear then because of the detection of the reflection radiation by the reflection sensor that a solder material deposit is located in the application position P3, the solder material deposit is treated with laser radiation of substantially higher power density on a second power setting of the laser device, said laser radiation allowing the solder material deposit to at least partially melt and, thus, the solder material deposit to be expelled from the application device by means of pressure gas.

In a preferred embodiment, the detector device is realized independently of the application device and is optically connected to the application opening of the application nozzle by means of a coupling device. In this way, it is possible to arrange the detector device independently of the device so that the detector device does not necessarily have to be realized on the housing of the device. Thus, the housing and in particular the application device can be designed in a comparatively simple fashion.

It proves particularly advantageous if the coupling device serves both to optically connect the application opening and the detector device and to optically connect the application opening and the laser device so that the structure of the device can be further simplified owing to the multiple function of the coupling device.

If the coupling device is arranged at the upper end of an application duct opposite of the application opening on the top side of an upper housing part of the device and has both a transparent coupling surface for forming an optical connection between the application opening and the laser device and a beam deflection device for deflecting the reflection radiation reflected by the solder material deposit toward the detector to device, the structure of the coupling device is compact on the one hand, and on the other hand the coupling device is arranged in an exposed manner on the top side of the housing so that the detector device can be freely arranged in the periphery of the device.

A particularly simple structure of the coupling device becomes possible if the coupling surface is formed by the beam deflection device, In particular this double function of the beam deflection device allows the realization of a miniaturized coupling device, which especially facilitates a desirable reduction of the mass of the device.

A particularly compact and simple design of the beam deflection device making possible the double function laid out above can be achieved if the beam deflection device is realized as a semitransparent mirror that is arranged at an angle of 45° to the optical axis between the laser device and the application opening.

It is also particularly advantageous if in addition to the reflection sensor, which detects the reflection radiation reflected by the solder material deposit arranged in the application opening of the application nozzle, the detector device has an optical temperature sensor that detects the infrared radiation emitted by the solder material deposit. By integrating the optical temperature sensor into the detector device, the latter cannot only serve to trigger the laser treatment of the solder material deposit by the laser device, but also to ascertain the temperature of the solder material deposit. The temperature of the solder material deposit allows optimizing the adjustment of the parameters of the laser device in particular on the basis of an empirically determined correlation between the temperature of the solder material deposit and its melting state.

An optimized setting of the laser device in situ, i.e. during operation of the device, can take place in particular if the temperature sensor is connected to a control device of the laser device in such a manner that the control device controls the operation of the laser device as a function of an output signal of the temperature sensor.

Figure 1:
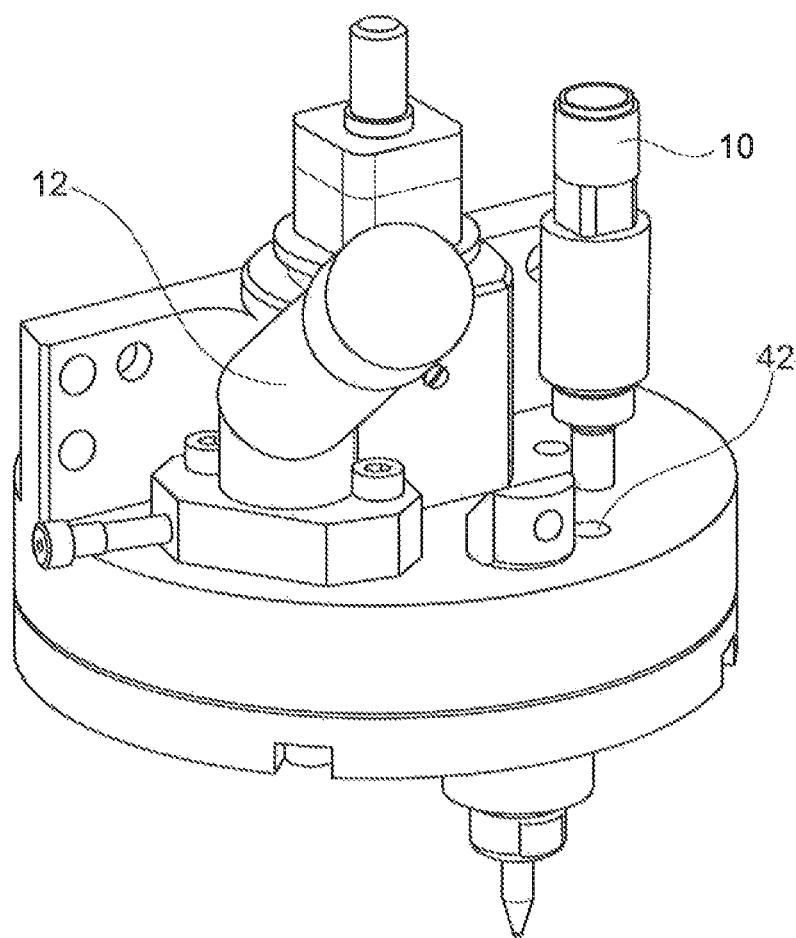
FIG. 1 shows a device for the separate application of solder material deposits in an isometric illustration.
Figure 2:
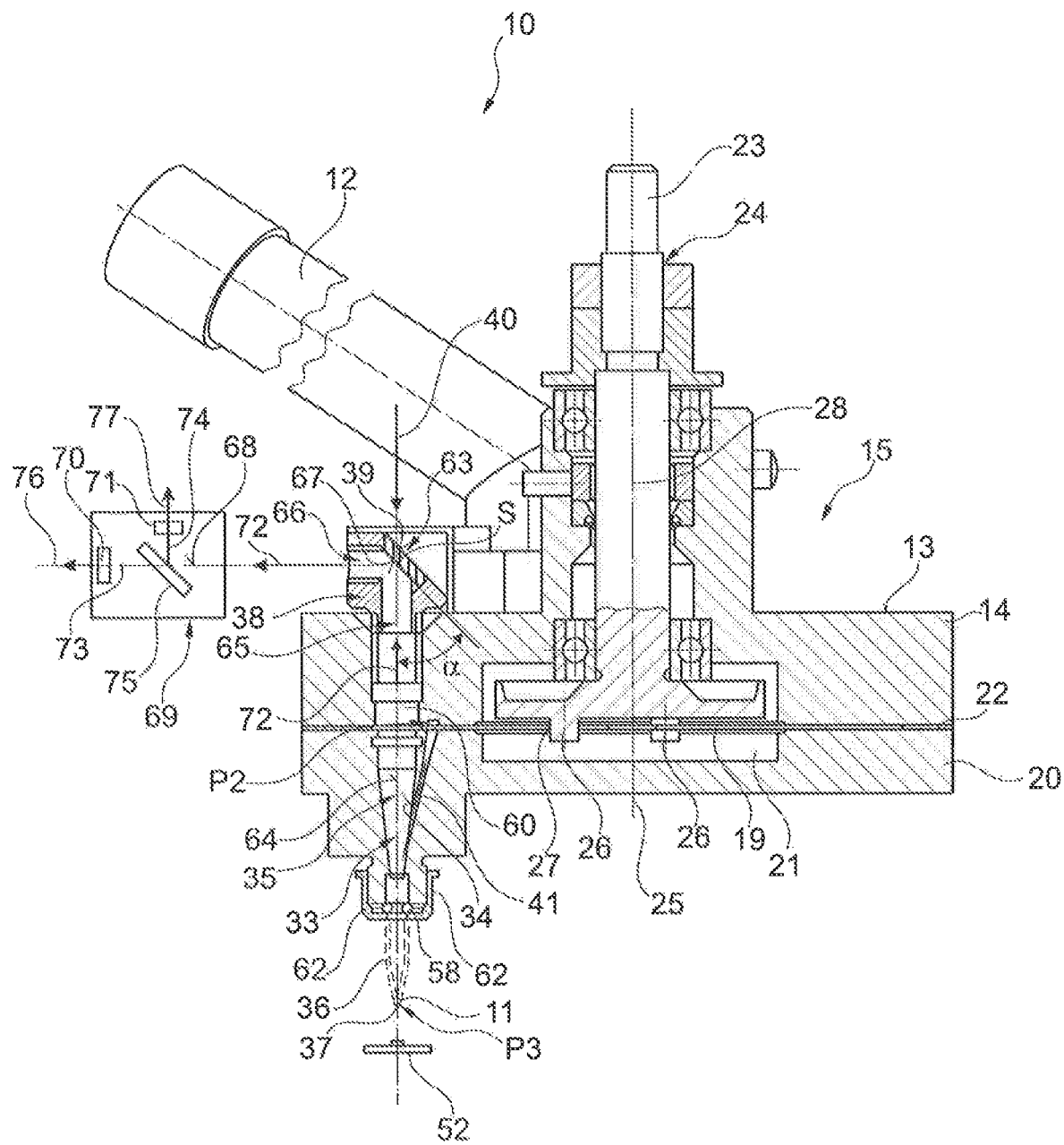
FIG. 2 shows the device illustrated in FIG. 1 in a sectional illustration.

In FIGS. 1 and 2, a device 10 for the separate application of solder material deposits 11 is illustrated, the solder material deposits 11 in the present case being realized as solder material balk that are held for provisioning in a solder material reservoir 12 that is arranged on a top side 13 of an upper housing part 14 of a device housing 15. in the upper housing part 14, a solder material duct 17 is formed below a connection opening 16 (FIG. 4), said solder material duct 17 allowing solder material deposits 11 to travel, as illustrated in FIG. 1, from the solder material reservoir 12 into transport holders 18 (FIG. 3) formed as passage holes of a conveying device 19 that is formed as a circular conveying disk and that is received between the upper housing part 14 and a lower housing part 20 in a circular conveying space 21. To form the circular conveying space 21, a housing ring 22 is arranged concentrically with respect to the conveying device 19 between the upper housing part 14 and the lower housing part 20.

Figure 3:
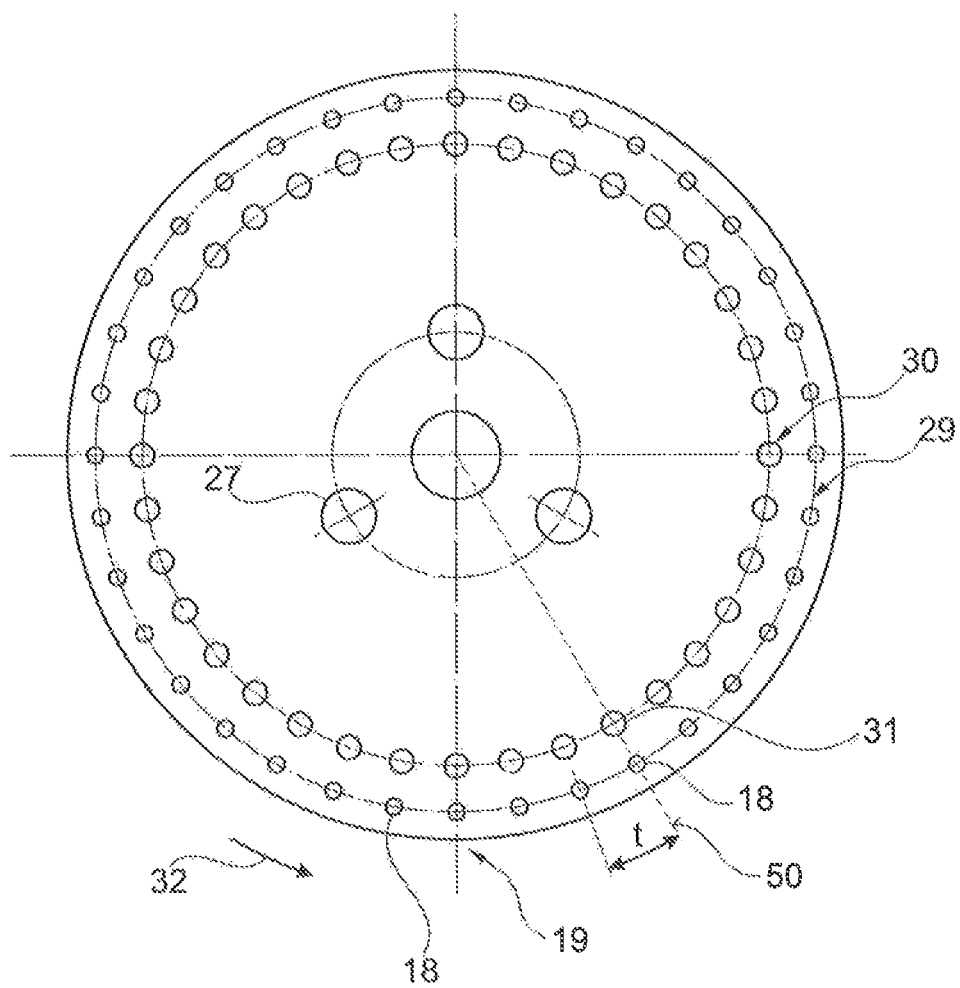
FIG. 3 shows a conveying device of the device illustrated in FIG. 2 in a top view.

In the upper housing part 14, a conveying shaft 24 is located that can be coupled with a motor drive (not illustrated) at its input end 23 and that allows a rotary drive of the conveying device 19 about a rotation axis 28 via drive pins 26 that are arranged at its output end 25 and engage into engagement openings 27 of the conveying device 19 illustrated in FIG. 3.

As FIG. 3 shows, in addition to the transport holders 18, which are arranged equidistantly on a conveying circle 29 of the conveying device 19, the conveying device 19 has a control circle 30 that is arranged concentrically and within the conveying circle 29 in the present case and that has control bores 31 on a common radial axis 50 with the transport holders 18 in each case. Said control bores 31 interact with a light barrier device (not illustrated) arranged in the device housing 15 and permit control of a clocked circular conveying motion of the conveying device 19 about the rotation axis 28 in such a manner that, in the conveying direction 32 of the conveying device 19, the transport holders 18 are moved forward out of a receiving position P1 below the solder material duct 17 connected to the solder material reservoir 12 each time by a graduation t of the conveying circle 29 in the conveying direction 32 and arrive in a transfer position P2 in which the transport holders 18 are located in a coaxial or flush arrangement with respect to a supply duct 41 that is formed in the lower housing part 20, extends from the transfer position P2 to the application device 33 and ends with a discharge end 34 in an application duct 35 of the application device 33, As shown in FIG. 2, the application device 33 has, on its lower end, an application nozzle 36 that is arranged in an exchangeable manner on the lower housing part 20 and comprises an application opening 37 which, in the present case, has a diameter that is smaller than the diameter of the solder material deposits 11 so that a solder material deposit 11 transferred from the transfer position P2 to the application nozzle 36 comes to bear against an opening edge of the application opening 37 in an application position P3. In the present case, the application nozzle 36 is screwed to the lower housing part 20 by means of a cap nut 62, the connection of the application nozzle 36 to the lower housing part 20 comprising a seal 58 so as to be sealed against the lower housing part 20.

At the upper end of the application duct 35, a coupling device 38 is arranged at the top side 13 of the device housing 15, said coupling device 38 being provided with a transparent coupling surface 39. Via the coupling surface 39, the solder material deposit 11 arranged in the application position P3 can be treated with laser radiation 40, which is emitted by a laser device (not illustrated).

In the present case, the coupling surface 39 is formed by a top side of a semi-transparent mirror 63 that is arranged at an angle $\alpha=45°$ on an optical axis 64 that extends between the application opening 37 and the laser device (not illustrated) emitting the laser radiation 40.

In the configuration of the device illustrated in FIG. 2, a solder material deposit 11 is located at the application opening 37 in the application position P3. The solder material 11 bears against an inner opening edge of the application opening 37.

As FIG. 2 shows, the coupling device 38, which is arranged at the upper end of the application duct 35 opposite of the application opening 37 on the top side 13 of the upper housing part 14, has a radiation duct 65 that is arranged coaxially to the optical axis 64 and a reflection duct 66 that is arranged vertically to the optical axis 64. The semi-transparent mirror 63 is arranged with a reflection surface 67, which here is formed by the bottom side of the mirror 63, in a point of intersection S of the reflection duct 66 and the radiation duct 65. On a reflection axis 68 that is arranged at a reflection angle $\beta=90°$ to the optical axis, a detector device 69 is provided that has a reflection sensor 70 and a temperature sensor 71 and that is realized independently of the device housing 15 in the present case.

If the solder material deposit 11 arranged in the application position P3 is treated with laser radiation 40 emitted by the laser device, the laser radiation 40 is at least partially reflected at the surface of the solder material deposit 11 so that reflection radiation 72 reflected by the solder material 11 is reflected onto the reflection surface 67 of the semi-transparent mirror 63, and from there it travels along the reflection axis 68 to the detector device 69, where the reflection beam 72 is separated into a reflection sensor beam 73 hitting the reflection sensor 70 and a temperature sensor beam 74 hitting the temperature sensor 71 by means of a beam separator, which is also realized as a semi-transparent mirror 75 in the present case.

When the device is in operation, the laser device is operated on two power settings in such a manner that on a first power setting, the laser radiation 40 is emitted as a pilot beam of relatively low energy density, said pilot beam being reflected as reflection radiation 72 by the solder material deposit 11, that is arranged in the application position P3 and hitting the reflection sensor 70 as a reflection sensor beam 73.

If it is clear from the detection of the reflection radiation 72 by the reflection sensor 70 that a solder material deposit 11 is located in the application position P3, the laser device is switched, triggered by an output signal 76 of the reflection sensor, to the second power setting, on which the laser radiation 40 is emitted as a power radiation of increased energy density. The power radiation causes the solder material deposit 11 to melt at least partially, the portion of infrared radiation contained in the reflection radiation 72 being detected by the temperature sensor 71 and a corresponding output signal 77 of the temperature sensor being generated. The output signal 77 of the temperature sensor allows the temperature of the solder material deposit 11 to be ascertained so that the output signal 77 of the temperature sensor can be used, for example, to adjust the power and/or a pulse duration of the laser radiation 40 in such a manner that the desired temperature and the desired melting state of the solder material deposit 11 is achieved.

The solder material deposit 11, which has been at least partially melted because of the laser treatment, is thrown out through the application opening 37 by means of an application of pressure gas via the supply duct 41 ending in the application duct 35 and is applied against a contact surface 51 of a substrate 52.

For example, the application of pressure vas can take place as a function of the fact that the application of pressure gas is triggered after detection of a solder material deposit in the application position P3 by the is reflection sensor 70 and after expiry of a predefined period of time in which the solder material deposit 11 is treated with power radiation.

Of course, it is also possible to operate the device in such a manner that the application of pressure gas takes place as a function of the fact that a defined melting state of the solder material deposit 11 is detected via the temperature sensor 71.

Figure 4:
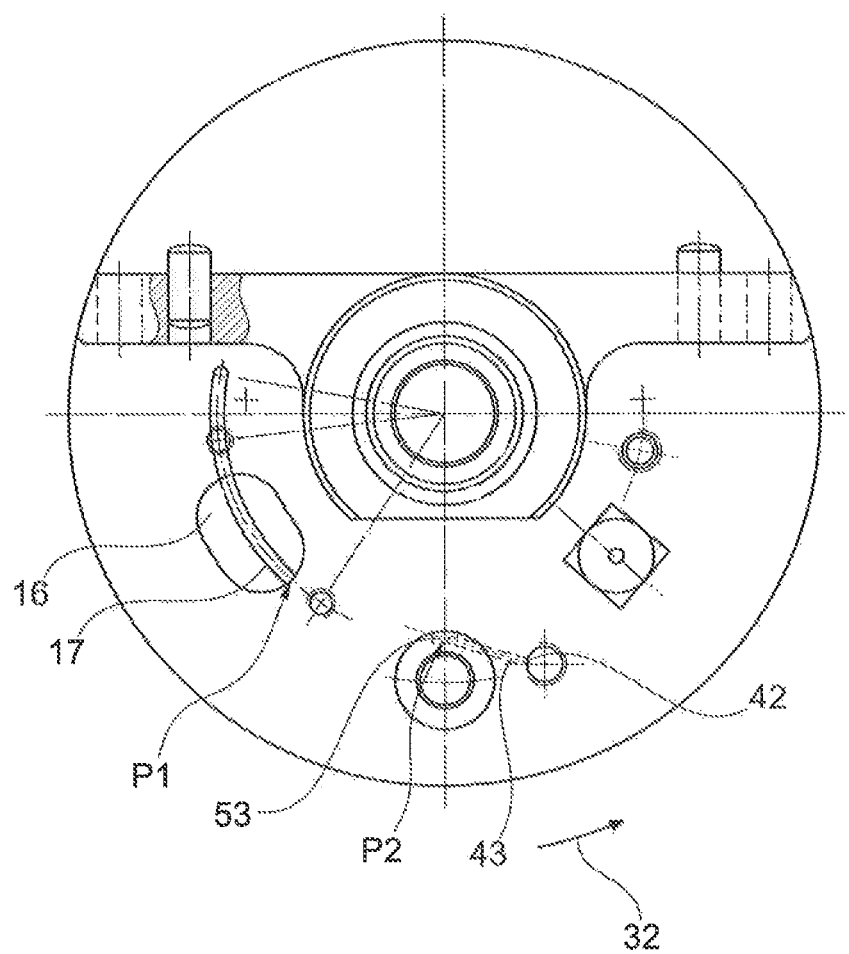
FIG. 4 shows a top view of a device housing of the device illustrated in FIGS. 1 and 2.

For the application of pressure gas, the upper housing part 14 comprises a pressure gas connection 42 illustrated in FIGS. 1 and 4, which is connected via a pressure gas duct 43 to a solder material deposit receiving space 53 formed in the upper housing part 14 above the transfer position P2 opposite of the upper end of the supply duct 41 formed in the lower housing part 20, fly means of the application of pressure gas to the solder material deposit 11 arranged in the solder material deposit receiving space 53, the solder material deposit 11 is also transferred into the application position P3 at the application opening 37 of the application nozzle.

The invention claimed is:

1. A device for the separate application of solder material deposits, said device comprising:

a conveying device separately conveying solder material deposits from a solder material reservoir toward an application device, the conveying device having transport holders formed as passage holes that can each be moved from a receiving position P1, in which a solder material deposit is received from the solder material reservoir, into a transfer position P2, in which the solder material deposit is exposed to a first application of pressure and from which the solder material deposit is transferred to an application opening of an application nozzle of the application device into an application position P3, the diameter of the application opening being smaller than the diameter of the solder material deposit;

a detector device triggering a treatment of the solder material deposit arranged in the application position P3 with laser radiation emitted by a laser device, the detector device including a reflection sensor detecting reflection radiation reflected by the solder material deposit arranged in the application position P3, wherein in addition to the reflection sensor, the detector device comprises an optical temperature sensor that detects infrared radiation emitted by the solder material in the application position P3, the optical temperature sensor triggering a second application of pressure from a pressure gas source connected to a solder material deposit receiving space above position P2 via a pressure gas supply duct ending in an application duct upon detecting a defined melting state of the solder material deposit, the second application of pressure forcing the at least partially melted solder material through the application opening and applying the solder material deposit against a contact surface of a substrate.

2. The device according to claim 1, in which the detector device is independent of the application device and optically connected to the application opening of the application nozzle by a coupling device.

3. The device according to claim 1, in which the coupling device serves both to optically connect the application opening and the detector device and to optically connect the application opening and the laser device.

4. The device according to claim 3, in which the coupling device is arranged at an upper end of the application duct opposite of the application opening on a top side of an upper housing part of the device and has both a transparent coupling surface forming an optical connection between the application opening and the laser device and a beam deflection device deflecting the reflection radiation reflected by the solder material deposit toward the detector device.

5. The device according to claim 4, in which the coupling surface is formed by the beam deflection device.

6. The device according to claim 5, in which the beam deflection device is a semi-transparent mirror arranged at an angle of approximately 45° to an optical axis between the laser device and the application opening.

7. The device according to claim 1, in which the temperature sensor is connected to a control device of the laser device, wherein the control device controls the operation of the laser device as a function of an output signal of the temperature sensor.

* * * * *

UNITED STATES PATENT AND TRADEMARK OFFICE
CERTIFICATE OF CORRECTION

PATENT NO. : 11,224,928 B2  
APPLICATION NO. : 15/102357  
DATED : January 18, 2022  
INVENTOR(S) : Ghassem Azdasht Page 1 of 1

It is certified that error appears in the above-identified patent and that said Letters Patent is hereby corrected as shown below:

In the Specification

Column 1, Line 13, "rerence as" should be --reference as--.

Column 5, Line 37, "pressure vas can" should be --pressure gas can--.

Column 5, Line 53, "20, fly means" should be --20. By means--.

Signed and Sealed this  
Eighth Day of March, 2022

Drew Hirshfeld  
*Performing the Functions and Duties of the  
Under Secretary of Commerce for Intellectual Property and  
Director of the United States Patent and Trademark Office*